United States Patent [19]
Sheffield

[11] Patent Number: 4,595,978
[45] Date of Patent: Jun. 17, 1986

[54] PROGRAMMABLE CONTROL CIRCUIT FOR CONTROLLING THE ON-OFF OPERATION OF AN INDICATOR DEVICE

[75] Inventor: Herman E. Sheffield, Houston, Tex.

[73] Assignee: Automatic Power, Inc., Houston, Tex.

[21] Appl. No.: 797,171

[22] Filed: Oct. 2, 1985

Related U.S. Application Data

[63] Continuation of Ser. No. 429,008, Sep. 30, 1982, abandoned.

[51] Int. Cl.$^4$ .................. G05B 19/04; G08B 5/31
[52] U.S. Cl. .................... 364/141; 340/331; 340/332; 365/227
[58] Field of Search .............. 364/140, 141, 143; 340/321, 331, 332, 945, 953, 981–985, 309.15; 365/226, 227

[56] References Cited

U.S. PATENT DOCUMENTS

| | | | |
|---|---|---|---|
| Re. 30,744 | 9/1981 | Cole et al. | 365/227 |
| 3,573,499 | 4/1971 | Lynes | 365/227 |
| 3,588,846 | 6/1971 | Linton et al. | 365/227 |
| 3,668,684 | 6/1972 | Johnson et al. | 340/321 |
| 3,686,645 | 8/1972 | Brojdo | 365/227 |
| 3,781,853 | 12/1973 | Jacobs | 340/331 X |
| 3,795,898 | 3/1974 | Mehta et al. | 365/227 X |
| 3,810,150 | 5/1974 | Jacobs | 340/331 X |
| 3,883,775 | 5/1975 | Aling | 340/811 X |
| 3,941,989 | 3/1976 | McLaughlin et al. | 340/811 X |
| 3,965,468 | 6/1976 | Bronson | 340/331 X |
| 4,007,451 | 2/1977 | Heuber et al. | 365/227 X |
| 4,024,491 | 5/1977 | Pellerin et al. | 340/331 X |
| 4,029,994 | 6/1977 | Iwans | 340/331 X |
| 4,124,842 | 11/1978 | Bachelor | 340/321 |
| 4,137,563 | 1/1979 | Tsunoda | 365/227 X |
| 4,151,611 | 4/1979 | Sugawara et al. | 365/227 |
| 4,323,881 | 4/1982 | Mori | 365/227 X |
| 4,408,182 | 10/1983 | Hashimoto et al. | 340/331 X |

OTHER PUBLICATIONS

"Pulsing a PROM's Supply Voltage Greatly Reduces the Energy Used", *Electronic Design*, Aug. 2, 1977, p. 102.

*Primary Examiner*—Joseph Ruggiero
*Attorney, Agent, or Firm*—Seidel, Gonda, Goldhammer & Abbott

[57] ABSTRACT

Although TTL-PROMs possess many advantages over their CMOS-PROM counterparts, their use in controlling on-off operations of indicators such as flashing navigational lights has been limited when battery power is required due to the high power consumption of such TTL-PROMs. Accordingly, a programmable control circuit is provided which includes a TTL-PROM together with a plurality of lower power consumption CMOS units and which minimizes the power consumption of the TTL-PROM. The TTL-PROM has a plurality of memory cells programmed with a plurality of code words. A CMOS addressing means is coupled to this PROM to generate address words to address the memory cells. This addressing serves to activate the PROM to output the appropriate code words in a parallel format. A CMOS parallel-series converter is coupled to receive the parallel format code words from the PROM and convert these to a serial code output signal. This serial code output signal is then used to drive the indicator device. In particular, in order to reduce the power consumption of the overall system, an intermittent power-up circuit is coupled to the PROM for powering the PROM on only during periods when it is necessary to permit addressing the PROM and transferring code words from the PROM to the parallel-series converter.

24 Claims, 2 Drawing Figures

PROGRAMMABLE CONTROL CIRCUIT FOR CONTROLLING THE ON-OFF OPERATION OF AN INDICATOR DEVICE

This application is a continuation, of application Ser. No. 429,008, filed Sept. 30, 1982, now abandoned.

FIELD OF THE INVENTION

The present invention pertains to an improved control circuit, and, in particular, to an improved programmable control circuit for controlling on-off operation of an indicator device such as flashing navigational lights or fog horns.

BACKGROUND OF THE INVENTION

With recent developments in semiconductor technology, considerable improvements have been made in the area of controlling the on-off operation of indicator devices such as navigational flashing lights and fog horns. Semiconductor logic circuitry is quite suitable for such implementation since, due to its small size, it can serve to reduce the overall size and weight necessary for each individual indicator unit. This can be especially significant with regard to flashing navigational lamps since a large number of such units are often used. Also, because of the relatively low power consumption of semiconductor devices, the units can be utilized in remote locations where only battery power is feasible. Further, semiconductor logic circuitry is generally quite reliable, which is also of utmost importance with regard to remote locations where servicing can be difficult.

In particular, the development of semiconductor techniques has led to a number of units for signalling with navigational lights utilizing programmable control means. Examples of such systems are U.S. Pat. Nos. 4,124,842; 4,029,994; 4,024,491; 3,810,150; and 3,781,853. These various patents teach systems which can provide desired signalling such as Morse Code signalling utilizing only battery power. Therefore, these systems are suitable for remote usage.

Notwithstanding such developments, a number of problems still exist in this area. In particular, the question of choosing a suitable programmable unit must be dealt with. This question leads to the necessity of making choices between units which each have their own drawbacks.

For example, one type of currently popular programmable unit which can be used in such systems is a programmable read-only memory (hereinafter referred to as a "PROM"). These units are generally programmed in advance with desired codes for the various flashing sequences desired, and then utilized with a suitable addressing circuit for selecting appropriate code words and passing these to the indicator devices for controlling the on-off operation thereof. Typically, the PROMs are either CMOS (complementary metal-oxide semiconductors) or TTL (transistor-transistor-logic). A number of commercially available models of each are presently available. However, before a choice is made in constructing a control system, the relative advantages and disadvantages of each must be considered.

With regard to this choice, it must be noted in the first place that the number of CMOS-PROMs currently available is much less than the number of TTL-PROMs. Alto, the CMOS units are more expensive. Besides this, the CMOS-PROMs are more sensitive to handling and are, in general, less stable than their TTL counterparts. However, the CMOS-PROMs have one very large advantage over the TTL-PROMs. This advantage is a considerably lower power consumption requirement. The drawback of the relatively high power required by a TTL-PROM presents a significant problem in remote location navigational indicators since the TTL-PROMs can rapidly drain the limited battery power available.

SUMMARY OF THE INVENTION

Accordingly, it is an object of the present invention to provide an improved programmable control circuit for controlling the on-off operation of an indicator device.

It is a further object of the present invention to provide an improved programmable control circuit for controlling the on-off operation of an indicator device which permits the use of a TTL-PROM as a programmable unit for the on-off sequencing while, at the same time, minimizing the power consumption of such a TTL-PROM.

To achieve these and other objects, a programmable control circuit is provided which includes a TTL-PROM together with a plurality of lower power consumption CMOS units. The TTL-PROM has a plurality of memory cells programmed with a plurality of code words. A CMOS addressing means is coupled to this PROM to generate address words to address the memory cells. This addressing serves to activate the PROM to output the appropriate code words in a parallel format. A CMOS parallel-series converter is coupled to receive the parallel format code words from the PROM and convert these to a serial code output signal. This serial code output signal is then used to drive the indicator device. In order to reduce the power consumption of the overall system, an intermittent power-up circuit is coupled to the PROM for powering the PROM on only during periods when it is necessary to permit addressing the PROM and transferring code words from the PROM to the parallelseries converter.

BRIEF DESCRIPTION OF THE DRAWINGS

Other objects and advantages of the present invention may be more clearly understood by reference to the following detailed description and drawings wherein.

DETAILED DESCRIPTION OF THE PREFERRED EMBODIMENT

Figure 1:
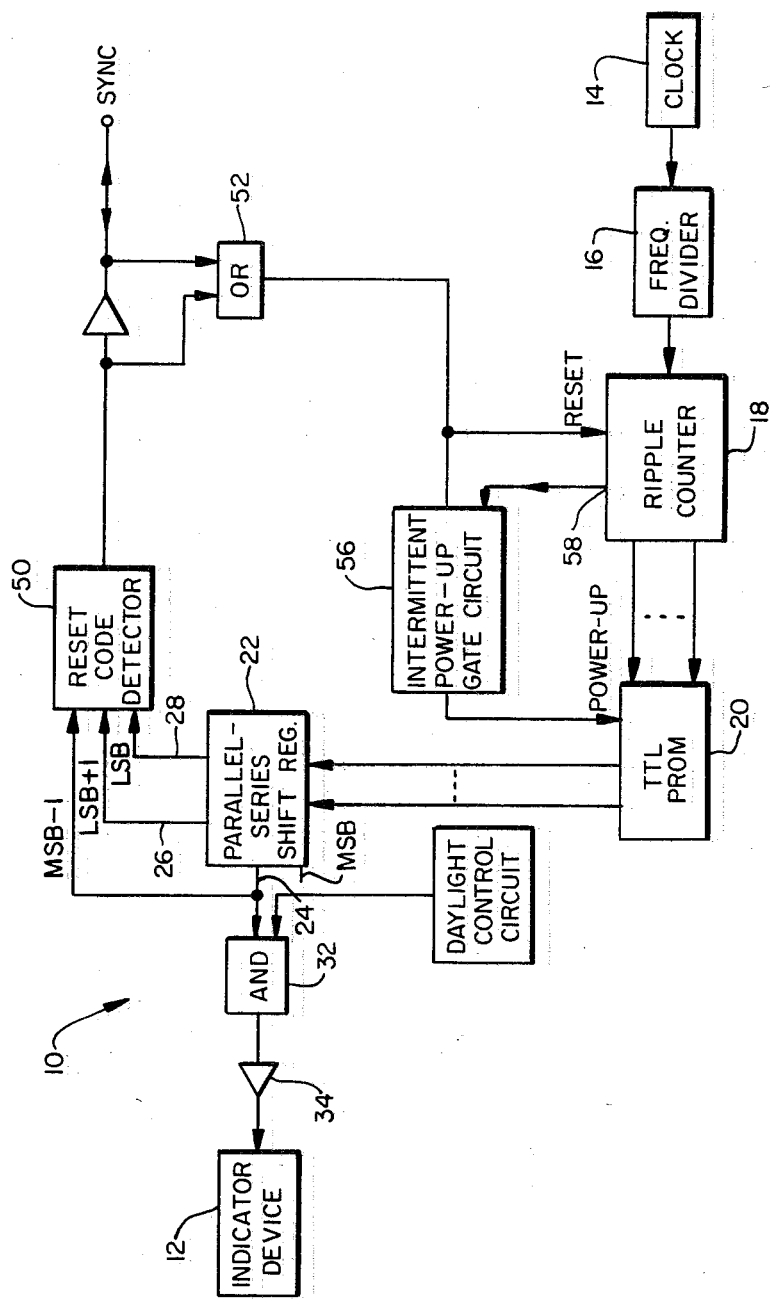
FIG. 1 shows a block diagram of one embodiment of a programmable control circuit in accordance with the present invention.

Referring to FIG. 1, a programmable control circuit 10 is shown for controlling the on-off operation of an indicator device 12. In the ensuing description, this indicator device 12 will be described in terms of a flashing DC incandescent light. However, it is to be understood that the invention could readily be used with other indicators such as fog horns or AC controlled lamps.

Figure 2:
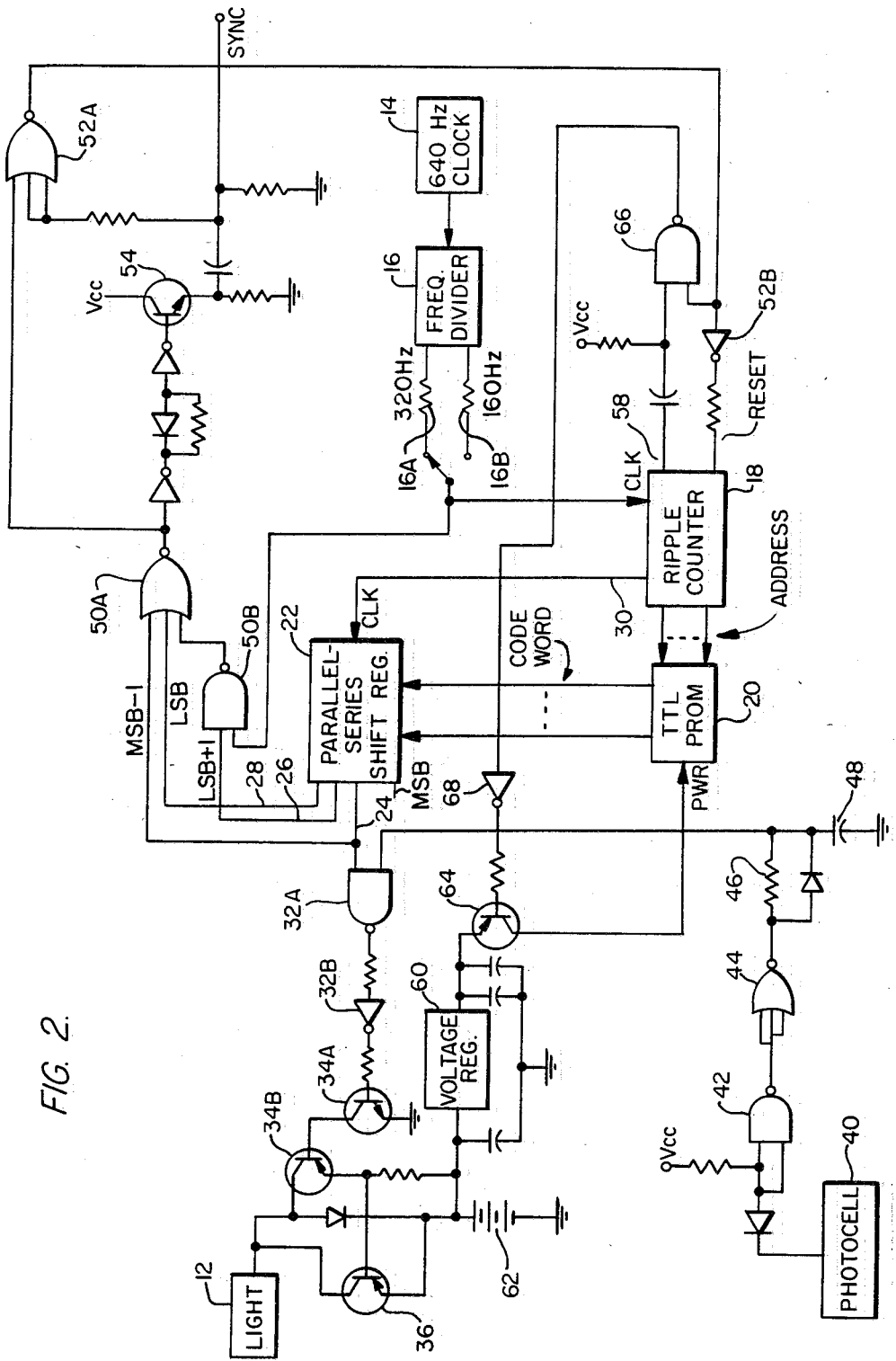
FIG. 2 shows a detailed schematic diagram to illustrate one implementation of the FIG. 1 embodiment.

FIG. 2 shows one example of a detailed implementation of FIG. 1. It should be noted that although FIG. 2 has been shown with all of the gates being constructed with negated outputs (i.e. NAND-NOR), all of the logic circuits could, of course, be implemented by any logic gate configuration desired using either positive or negative logic as long as the requirements of the various gating operations are met.

Looking in detail now to FIGS. 1 and 2, a clock signal is provided for the programmable control circuit 10 by a clock circuit 14. This clock circuit can be divided to a suitable frequency for circuit operation by a frequency divider 16. Since the time intervals of the desired signal sequences may vary, the frequency divider can be arranged to provide different frequency division ratios to account for this. For example, as shown in FIG. 2, if a 640 Hz clock oscillator is used as the clock circuit 14, the frequency divider can be set to provide either a 320 Hz output or a 160 Hz output. This is done simply by selecting which of the resistors 16A or 16B will provide the output of the frequency divider. Which of these outputs is used depends on the total time required for an entire sequence to be transmitted. Selecting the lower 160 Hz signal will permit a longer time span for the sequence transmission.

the output of the frequency divider 16 is passed to a ripple counter 18 which may be a CD4020 or equivalent, which serves as an addressing device for a TTL-PROM 20. The ripple counter 18 also serves as the basic timing unit for other elements of the control circuit, and serves to start the entire timing sequence for the flashing light beginning with a reset signal which will be described in detail hereinafter.

Typically, the ripple counter 18 will generate parallel address words for the PROM 20 which will address different portions of the PROM. In response to this accessing, the PROM will generate parallel code words at its output. Examples of TTL-PROMs which are suitable for use for the present invention are the TBP 24 S 10 manufactured by Texas Instruments or the SN HS 74-287 manufactured by National Semiconductor. Both of these PROMs are 256×4 memories, but it should, of course, be noted that the present invention is not limited to any particular size or model of PROM.

As an example, the code word stored in the PROM can be 4-bit control words which represent hexadecimal numbers which equate to Morse Code operation for the flashing light. Also, a bit pattern which is normally not used for the Morse Code itself can be chosen as a reset code for the ripple counter 18, as will be discussed hereinafter.

The parallel code word from the PROM 20 is fed to parallel inputs of a parallel-series shift register 22. As noted above, this code word represents a unique hexadecimal number which is determined by the address fed from the ripple counter 18 to the PROM 20. As can be seen in FIGS. 1 and 2, the shift register 22 has both a serial output 24 and two parallel outputs 26 and 28. The serial output 24 can represent one of the most significant bit locations (MSB) of the 4-bit parallel code word fed into the shift register. As illustrated in the FIG. 2 embodiment, the most significant bit will be dropped and the second most significant bit will be used to provide the serial output 24. The two parallel outputs 26 and 28 can be the two least significant bits (LSBs) of the input code word. The shift register 22 is coupled to receive a clock output from the ripple counter 18 on a line 30 (see FIG. 2) which operates to shift out the hexadecimal code from the shift register at 50 msec intervals.

The serial output 24 of the shift register 22 is coupled via an AND gate 32 (shown on the FIG. 2 negative output logic implementation as being a NAND gate 32A and an inverter 32B) through an amplifier circuit 34 to the light 12. As shown in FIG. 2, the amplifier can be, for example, a pair of transistors 34A and 34B. Also, as shown in FIG. 2, an output transistor 36 controlled by the output of these amplifying transistors 34A and 34B provides the final control output for the light 12. In this manner, the flashing characteristics of the light 12 are controlled by the serial output 24 of the shift register 22. By appropriately setting the code in the PROM 20, this control can be in any desired flashing sequence such as Morse code or another chosen code.

In addition to being fed to the serial output 24 of the shift register 22, the AND gate 32 (NAND 32A and inverter 32B in FIG. 2) is fed with a daylight control signal from a daylight control circuit 38. This daylight control circuit 38 serves to prevent operation of the light 12 if it is daylight. As shown in FIG. 2, such a daylight control arrangement can be implemented in negative output logic by a photocell 40 coupled through a NAND gate 42 (having an input from the photocell 40 and a voltage supply $V_{CC}$), a NOR gate 44 having all inputs tied to the NAND gate output, and delay circuit comprising a resistor 46 and a capacitor 48.

The daylight control circuit 38 operates such that when the photocell impedance of 40 is high (that is when the light level is low), a positive signal will be applied to the gate 32 (32A and 32B in FIG. 2) to allow the coded signal from the serial output 24 of the shift register 22 to pass through the gate 32 to activate the output transistor 36 to turn on the light 12. On the other hand, during daylight when the light level is high, the photocell impedance of photocell 40 will be low. This will cause the NOR gate 44 to produce a low output which will prevent the gate 32 from allowing the serial output 24 of the shift register 22 to pass to the output transistor 36. The delay circuit comprising the resistor 46 and the capacitor 48 functions to prevent cutoff of the light 12 by flashing of the light itself at nighttime since it will delay any application from the temporary light of flashing from reaching the gate 32A until the serial output 24 from the shift register 22 has elapsed.

As previously noted, in addition to the serial output 24, the shirt register 22 has a pair of parallel output terminals 26 and 28 which correspond to the two least significant bits of the code word fed to the shift register 22 from the PROM 20. These parallel output terminals 26 and 28 provide a 2-bit code themselves which serves to generate a reset for the ripple counter 18 and a sync signal for other programmable control circuits which are coupled to the programmable control circuit 10. This reset establishes the beginning of the time sequence for all of the timing and addressing carried out by the ripple counter 18.

In order to provide this reset and sync operation, the parallel output terminals 26 and 28 are coupled, along with the serial output 24, to a reset code detector 50. As seen in FIG. 2, this reset code detector can be implemented by a NOR gate 50A and a NAND gate 50B. This particular arrangement in FIG. 2 is set to establish the detection of a unique code word 010 (i.e. binary 2) which has been selected as the reset code word (noting that the most significant bit of the original 4-bit code word fed to the shift register 22 has been dropped). Of course, other code words and logic gate arrangements could be selected for the reset operation, and the FIG. 2 arrangement is shown purely by way of example of one possible implementation.

When the reset code detector 50 detects the presence of the predetermined reset code, a reset output signal is generated (e.g. at the output of the NOR gate 50B in FIG. 2). This reset output signal is fed to a reset terminal of the ripple counter 18 through an OR gate 52 (implemented in FIG. 2 as NOR gate 52A and inverter 52B). Thus, the ripple counter 18 is reset to a predetermined value. Typically, this predetermined value will start the addressing of the PROM at the address 0000 and begin the timing sequence for flashing the light 12 all over again.

In addition to providing the reset for the ripple counter 18, the reset signal output of the reset code detector 50 is also applied to a synchronizing terminal SYNC. As shown in FIG. 2, this can be done through an output transistor 54. By virtue of this arrangement, other programmable control circuits which control other flashing lights in a manner similar to that of the programmable control circuit 10 described to this point can be advised of the fact that the programmable control circuit 10 has just reset its ripple counter 18. Thus, the other programmable control circuits can also be made to reset their ripple counters at the same time as that all of the flashing sequences for a plurality of lights will begin together. At the same time, the synchronizing terminal SYNC provides a means for the programmable control circuit 10 to have its own ripple counter 18 reset when the reset detection signals of other programmable control circuits are generated. This is accomplished by the fact that the SYNC terminal is also connected to the input of the OR gate 52 (implemented by NOR gate 52A and inverter 52B in FIG. 2). Thus, when a reset detection signal from another programmable control circuit is received at the synchronizing terminal SYNC, it will be coupled through the OR gate 52 to the reset terminal of the ripple counter 18 in the same manner as if the reset detection signal had been generated by the reset code detector 50 of the programmable control circuit 10. Thus, the programmable control circuit 10 has both the ability to reset other programmable control circuits and the capability of being reset by them.

By coupling it to a power source, the system described up to this point would be quite capable of controlling the flashing sequence of a light (or other related on-off operations) and providing synchronization between a plurality of programmable control circuits for such flashing. However, as noted in the background of the invention, although many of the elements of the circuit could be implemented by CMOS (for example, the clock generator 14, the frequency divider 16, the ripple counter 18, and the shift register 22), it is preferable to use a TTL-PROM for the PROM 20 due to the many advantages of such TTL-PROMs over CMOS-PROMs. But such a TTL-PROM has the disadvantage of high power consumption. For example, presently available TTL-PROMs generally draw between 100 to 150 milliamps of current. Thus, the programmable control circuit of the present invention has means for specifically minimizing this power consumption, as will now be described.

Turning to FIG. 1, this minimization of power consumption is achieved by the use of an intermittent power-up gate circuit 56 coupled between a power supply terminal of the PROM 20 and an output terminal 58 of the ripple counter 18 which produces an intermittent power-up signal. As shown in detail in FIG. 2, this intermittent power-up circuit 56 includes a voltage regulator 60 coupled to a power supply 62 for producing a regulated output voltage. As a preferred example, the power source 62 can be either a 6-volt or 12-volt DC source with the voltage regulator 60 set to establish a 5-volt regulated DC output voltage in either case. This regulated output voltage is fed to an emitter of a control PNP transistor 64 which has its collector coupled to a power supply terminal of the PROM. The base of the control transistor 64 is coupled to the output terminal 58 of the ripple counter through a NAND gate 66 and an inverter 68. The other input to the NAND gate 66 is coupled to the NOR gate 52A output.

In operation, the output terminal 58 of the ripple counter 18 will normally be positive when the PROM 20 is to be turned off. This positive signal is fed to one input of the NAND gate 66. Since the other input to the NAND gate 66 from the NOR gate 52A will also usually be positive (unless a reset signal is being generated), the output of the NAND gate 66 will generally be negative. This will be inverted by the inverter 68 to provide a positive signal to the base of the PNP transistor 64 which will maintain it in a cut-off condition. Therefore, the transistor 64 will not permit the regulated voltage from the voltage regulator 60 to reach the PROM 20.

On the other hand, when the PROM 20 is to be powered-up, the output from the terminal 58 of the ripple counter 18 will go negative. This will cause the output of the NAND gate 66 to go positive. This positive signal will be inverted by the inverter 68 to provide a negative signal to the base of the PNP transistor 64 to turn it on. Thus, the regulated voltage from the voltage regulator 60 will be supplied to the PROM 20 to power it up.

Similarly, if a reset signal is generated, the output of the NOR gate 52A will go negative. This will produce the same result of turning on the transistor 64. Therefore, the PROM 20 will be powered-on if either a negative power-up pulse is generated by the ripple counter 18 or if a reset pulse is received either from the programmable control circuit 10 or an outside programmable control circuit.

It should be noted at this point that although this operation for powering-up the PROM (which is essentially an OR operation since the PROM will be powered-up when either of two conditions exist) has been shown with a particular implementation of a PNP transistor 64 in conjunction with a NAND gate 66, an inverter 68, a NOR gate 52 and a negative pulse from the terminal 58 of the counter 18, the same operation could, of course, be implemented using positive signals from the ripple counter and AND and OR gates if desired.

With regard to the timing of the negative intermittent power-up signal from the ripple counter 18, this is done at an interval and for a time period sufficient to permit addressing the PROM by the ripple counter 18 and transferring code words to the shift register 22. With regard to the particular example illustrated in FIG. 2 using either a 320 or 160 Hz frequency divider output, a 256×4 PROM, and a 50 millisec clock output for the shift register, it has been found that a negative pulse duration of 200 microseconds every 0.2 seconds is sufficient for the negative intermittent power-up signal. Thus, it can be seen that a great saving of power can be achieved since the PROM is turned on for only a short amount of time every 0.2 seconds. This can be appreciated in terms of the fact that in the FIG. 2 embodiment with the operating parameters discussed above, a current drain of less than 5 milliamps is required. Of course, it is to be recognized that the particular time periods given above are solely by way of example. The particular timing used in any particular system is, of course, dependent upon the particular system parameters in effect.

Although the invention has been described above in terms of the preferred embodiment of FIG. 2, it is to be understood that other modifications could be made to implement the invention within the scope of the claimed invention. For example, although the invention has been specifically set forth in terms of using a ripple counter for addressing and timing and a parallel-to-series shift register for controlling the flashing sequence and the reset, other circuit structure could be devised within the claimed invention for carrying out these operations. Numerous other arrangements may be readily devised by those skilled in the art which embody the principles of the invention and fall within its spirit and scope.

I claim:

1. A programmable control circuit for controlling the on-off states of an indicator device comprising:
    a memory circuit having a plurality of memory cells programmed with a plurality of code words indicative of a desired on-off sequence to be provided by the indicator device;
    an addressing means coupled to said memory circuit for generating address words to address said memory cells of said memory circuit to activate said memory circuit to output said code words in parallel format in accordance with said address words;
    a parallel-to-series conversion means coupled to receive said parallel format code words from said memory circuit and to convert said parallel format code words to a serial code output signal;
    output means coupled to receive said serial code output signal from said parallel-to-series conversion means and to drive said indicator device in accordance with said serial code output signal, and
    an intermittent power-up circuit coupled to said memory circuit for powering-on said memory circuit only during periods necessary to permit addressing said memory circuit and transferring said parallel format code words from said memory circuit to said parallel-series conversion means.

2. A programmable control circuit according to claim 1, wherein said memory circuit comprises a TTL-PROM and said addressing means comprises a CMOS counter operated by a clock circuit to generate a count sequence for addressing said TTL-PROM.

3. A programmable control circuit according to claim 1, wherein said parallel-series conversion means comprises a parallelseries shift register.

4. A programmable control circuit according to claim 1, wherein said indicator device is a light.

5. A programmable control circuit according to claim 1, wherein said indicator device is a horn.

6. A programmable control circuit according to claim 2, wherein said intermittent power-up circuit is coupled between an output of said counter which generates an intermittent power control signal and a power-up input terminal of said TTL-PROM, and further wherein said intermittent power-up circuit comprises:
    a DC power source;
    a voltage regulator coupled to said DC power source to produce a regulated DC voltage at an output terminal of said voltage regulator; and
    a switch means having a coupling path located between said voltage regulator output terminal and said power-up input terminal of said TTL-PROM, said switch means having a control terminal coupled to receive said intermittent power-up control signal from said counter to close said coupling path when said intermittent power-up control signal is received to pass said regulated DC voltage through said coupling path to said power-up terminal of said TTL-PROM.

7. A programmable control circuit according to claim 6, wherein said voltage regulator is arranged to convert both 6-volt and 12-volt power source signals to a predetermined voltage, and wherein said intermittent power-up circuit includes terminals for coupling to a DC power source which can be either 6 volts or 12 volts so that said programmable control circuit can be operated with either 6- or 12-volt power supplies without changing any circuit components of said programmable control circuit.

8. A programmable control circuit according to claim 6, wherein said TTL-PROM is programmed to include a reset code for resetting said counter to a predetermined number, said reset code comprising at least two bits of said parallel format code word, and wherein said programmable control circuit further includes:
    a pair of output terminals of said parallel-series conversion means for providing a parallel reset code word corresponding to bit locations of said reset code in said parallel format code word;
    detector means coupled to said pair of parallel output terminals for receiving said parallel reset code word and producing a reset detection output signal when said reset code has been passed from said TTL-PROM to said parallel-series conversion means and has been produced as a reset code word at said pair of parallel output terminals; and
    a reset feedback path coupled between said detector means and a reset terminal of said counter for providing said reset detection output signal to reset said counter.

9. A programmable control circuit according to claim 8, wherein said reset feedback path includes a sync terminal for coupling to at least one additional programmable control circuit for providing an indication to said additional programmable control circuit that a reset detection output signal has been produced.

10. A programmable control circuit according to claim 9, wherein said reset feedback path further includes a gate coupled to said sync terminal for receiving an indication from said additional programmable control circuit that a reset detection output signal has been produced in said additional programmable control circuit so that said counter will be reset when a reset detection output signal is produced in said additional programmable control circuit.

11. A programmable control circuit according to claim 8, wherein said intermittent power-up circuit includes a gate coupled to receive said intermittent power-up control signal from said counter and coupled to said reset feedback path to receive said reset direction output signal so that said TTL-PROM will be powered on both when said intermittent power-up control signal is generated by said counter and when said reset detection output signal is generated.

12. A programmable control circuit for controlling on-off states of an indicator device comprising a TTL-PROM having a plurality of memory cells programmed with a plurality of code words indicative of a desired on-off sequence to be provided by the indicator device;
    a CMOS counter coupled to said TTL-PROM for addressing said memory cells in accordance with a parallel format address word having a predetermined number of bits generated in accordance with said counter output in order to activate said TTL-PROM to output said code words in a parallel format in accordance with the count of said counter;

a CMOS parallel-series shift register coupled to receive said parallel format code words from said TTL-PROM and having a serial output for providing a serial code signal corresponding to one bit location of said parallel format code words and at least two parallel output terminals for providing an auxiliary parallel code word corresponding to two other bit locations of said parallel format code word, said auxiliary parallel code word comprising a reset code signal;

output means coupled to said output terminal of said parallel-series shift register to receive said serial code signal therefrom to drive said indicator means in accordance with said serial code signal;

an intermittent power-up circuit coupled between said TTL-PROM and a power-up terminal of said counter which intermittently produces a power-up signal so that said TTL-PROM will be turned on only during periods necessary to permit addressing said TTL-PROM and transferring said parallel code words from said TTl-PROM to said parallel-series shift register; and a reset circuit coupled between said two parallel output terminals of said shift register and a reset terminal of said counter for resetting said counter when a predetermined reset code signal is produced at said two parallel output terminals.

13. A programmable control circuit according to claim 12, wherein said reset circuit includes a sync terminal for coupling to at least one additional programmable control circuit so that said counter can be reset upon receipt of a synchronizing reset signal from said additional programmable control circuit.

14. A programmable control circuit according to claim 12, wherein said reset circuit is coupled to said intermittent power-up circuit in order to power-on said TTL-PROM both when an intermittent power-up signal is generated by said controller and when said counter is reset.

15. A programmable control circuit according to claim 13, wherein said reset circuit is coupled to said intermittent power-up circuit in order to power-on said TTL-PROM both when an intermittent power-up signal is generated by said counter and when said counter is reset.

16. A programmable control circuit for controlling the on-off states of an indicator device on a navigational air comprising;

memory circuit means having a plurality of memory cells for storing a plurality of code words indicative of an on-off sequence desired to be provided by the indicator device;

addressing means operatively coupled to said memory circuit means for generating address words to address said memory cells to output said code words in parallel format;

conversion means operatively coupled to said memory circuit means for converting said parallel format code words to a serial code output signal;

output means operatively coupled to said conversion means for driving said indicator device in a preselected on-off sequence in accordance with said serial code output signal;

intermittent power-up circuit means coupled to said memory circuit means for intermittently powering-up said memory circuit means to permit addressing said memory cells and transfer of said parallel format code words to said conversion means;

detector means coupled to said conversion means for detecting the presence of a reset code provided by said memory circuit means;

a sync terminal;

circuit means operatively coupled to said detector means, said addressing means and said sync terminal for providing a reset signal to said addressing means and to said sync terminal in response to the detection of said reset code by said detection means; and a daylight control circuit operatively coupled to said output means for disabling said indicator device during periods of daylight.

17. A circuit for controlling the on-off sequence of an indicator device on a navigational aid comprising:
(a) a memory circuit having plural addressable memory cells for storing a plurality of code words indicative of an on-off sequence to be provided by the indicator device;
(b) an addressing circuit coupled to the memory circuit for generating address words to address the memory cells, the first means presenting ones of the code words at an output thereof according to the generated addresses;
(c) an output circuit responsive to the code words provided by the memory circuit for sequencing the indicator device in a predetermined on-off pattern that is indicated by the presented code words
(d) an intermittent power up circuit coupled to a power up terminal on the memory circuit for powering up the memory circuit only during periods necessary to permit addressing, the intermittent power up circuit comprising a switching circuit having a coupling path between a DC power source and the power up terminal, and a control terminal receiving an intermittent power up signal generated by the addressing circuit for closing the switching circuit.

18. A programmable control circuit for controlling the on-off sequence of an indicator device on a navigational aid comprising:
(a) a memory device having a plurality of memory cells for storing a plurality of code words, at least a portion of one of the code words defining a reset code;
(b) a clock driven counter operatively coupled to the memory circuit for generating address words to address the memory cells and output the code words in parallel format;
(c) a parallel-series shift register having parallel date inputs operatively coupled to an output of the memory circuit and a clock input operatively coupled to the counter for converting the parallel format code words to a serial code output signal;
(d) an output circuit operatively coupled to a serial output of the shift register for driving the indicator device in a preselected on-off sequence in accordance with the serial code output signal;
(e) a reset code detection circuit operatively coupled to selected parallel output terminals of the shift register for detecting the presence of the reset code and providing a reset signal in response thereto;

(f) an intermittent power up circuit providing a switched path between a DC voltage source and a power up terminal on the memory device, the intermittent power up circuit being responsive to the output of a gate receiving as inputs (i) the reset signal and (ii) an intermittent power up signal provided by the counter to close the switched path and provide DC voltage to the power up terminal when one of the intermittent power up or reset signals occurs;

(g) a daylight control circuit for detecting the presence of daylight and inhibiting the operation of the indicator device during periods of daylight; and (h) a synchronizing terminal for coupling to at least one additional programmable control circuit for providing an indication to the additional programmable control circuit that a reset signal has been produced and for receiving an indication from the additional programmable control circuit that a reset signal has been produced in the additional programmable control circuit, the programmable control circuit receiving the indication that a reset signal has been produced responding as though it had produced the reset signal.

19. A control circuit for controlling the on-off sequence of an indicator device on a navigational aid comprising:

(a) first means having a plurality of addressable memory locations for storing plural data words indicative of an on-off sequence desired to be provided by the indicator device, at least a portion of one of the data words defining a reset code;

(b) second means for addressing ones of the memory locations in a predetermined sequence, the first means presenting ones of the data words at an output thereof according to the memory locations addressed by the second means;

(c) third means for energizing and deenergizing the indicator device in the desired on-off sequence according to the data words presented at the output of the first means;

(d) fourth means for detecting when the reset code has been presented, the second means being responsive to the detection of the reset code to begin addressing the first means from a predetermined starting address; and (e) fifth means for generating a synchronizing pulse in response to the detection of the reset code by the fourth means and for receiving a synchronizing pulse from another control circuit coupled to a synchronizing terminal associated with the fifth means, the second means responding to the receipt of the synchronizing pulse from the other control circuit to begin addressing the first means from the predetermined starting address.

20. Control circuit according to claim 19 further comprising means responsive to daylight for disabling the indicator device during periods of daylight.

21. Control circuit according to claim 20 wherein the first means is actuatable between power on and power off conditions further comprising means responsive to one of (i) the detection of the reset code and (ii) the receipt of the synchronizing pulse for actuating the first means in the power on condition only during periods necessary to permit addressing of the first means.

22. Control circuit according to claim 21 wherein the output of the first means is in parallel data format and each data word comprises a plurality of data bits each indicative of a desired on-off state further comprising means for converting the parallel data words to a serial code output signal.

23. A navigational light system comprising a plurality of synchronized control circuits and an indicator device associated with each control circuit, each control circuit comprising:

(a) first means having a plurality of addressable memory locations for storing data words indicative of an on-off sequence desired to be provided by the indicator device, at least a portion of one of the data words defining a reset code;

(b) second means for addressing ones of the memory locations in a predetermined sequence, the first means presenting ones of the data words at an output thereof according to the memory locations addressed by the second means;

(c) third means for energizing and deenergizing the indicator device in the desired on-off sequence according to the data words presented at the output of the first means;

(d) fourth means for detecting when the reset code has been presented, the second means being response to the detection of the reset code to begin addressing the first means from a predetermined starting address;

(e) fifth means, including a synchronizing terminal for coupling to the synchronizing terminal of one of the other control circuits, for generating a synchronizing pulse in response to the detection of the reset code by the fourth means and for receiving a synchronizing pulse generated by one of the other control circuits, the second means responding to the receipt of a synchronizing pulse from one of the other control circuits to begin addressing the first means from the predetermined starting address; and (f) sixth means for disabling the indicator device during periods of daylight;

whereby each control circuit has both the ability to reset the other control circuits and the capability of being reset by the other control circuits so that all of the control circuits operate in synchronism.

24. In a navigational light system having a plurality of control circuits and an indicator device associated with each control circuit, a method of controlling each control circuit comprising the steps of:

(a) storing in an addressable memory a plurality of data words indicative of an on-off sequence desired to be provided by the indicator device, including a reset code;

(b) addressing ones of the data words in a predetermined sequence and presenting the addressed data words at an output of the memory;

(c) energizing and deenergizing the indicator device in the desired on-off sequence according to the data words presented at the output of the memory;

(d) detecting when the reset code has been presented at the output of the memory and beginning, in response to the detection of the reset code, to address the memory from a predetermined starting address;

(e) generating a synchronizing pulse in response to the detection of the reset code and providing the synchronizing pulse to the other control circuits for resetting the other control circuits;

(f) beginning, in response to a synchronizing pulse generated by another control circuit, to address the memory from the predetermined starting address.

* * * * *